(12) United States Patent
Ironmonger et al.

(10) Patent No.: US 11,484,785 B2
(45) Date of Patent: Nov. 1, 2022

(54) INPUT APPARATUS FOR A GAMES CONSOLE

(71) Applicant: Ironburg Inventions Limited, Wincanton (GB)

(72) Inventors: Duncan Ironmonger, Suwanee, GA (US); Carl Jeffrey, Cheltenham (GB); Michael Parker, Cheltenham (GB)

(73) Assignee: Ironburg Inventions Limited, Wincanton (GB)

( * ) Notice: Subject to any disclaimer, the term of this patent is extended or adjusted under 35 U.S.C. 154(b) by 0 days.

(21) Appl. No.: 17/393,500

(22) Filed: Aug. 4, 2021

(65) Prior Publication Data

US 2021/0370165 A1 Dec. 2, 2021

Related U.S. Application Data

(63) Continuation of application No. 16/621,333, filed as application No. PCT/BG2018/051585 on Jun. 11, 2018, now Pat. No. 11,103,775.

(60) Provisional application No. 62/518,239, filed on Jun. 12, 2017.

(51) Int. Cl.
*A63F 13/24* (2014.01)
*A63F 13/285* (2014.01)
*A63F 13/428* (2014.01)
*A63F 13/98* (2014.01)

(52) U.S. Cl.
CPC ............ *A63F 13/24* (2014.09); *A63F 13/285* (2014.09); *A63F 13/428* (2014.09); *A63F 13/98* (2014.09); *A63F 2300/1043* (2013.01)

(58) Field of Classification Search
None
See application file for complete search history.

(56) References Cited

U.S. PATENT DOCUMENTS

| 5,430,262 A | * | 7/1995 | Matsui | ................. H01H 25/041 200/18 |
| 2008/0015017 A1 | * | 1/2008 | Ashida | .................... A63F 13/98 463/37 |

(Continued)

FOREIGN PATENT DOCUMENTS

| EP | 1 140 303 | 1/2007 |
| EP | 1 078 660 | 10/2009 |

OTHER PUBLICATIONS

European Patent Office, "Communication pursuant to Article 94(3) EPC," App. No. 18 732 453.8 (dated Nov. 29, 2021).

(Continued)

*Primary Examiner* — Jason T Yen
(74) *Attorney, Agent, or Firm* — Walters & Wasylyna LLC

(57) ABSTRACT

The invention provides an improved controller (110) for a games console. The invention is a games controller (110) that is intended to be held by a user in both hands in the same manner as a conventional controller (1). The controller of the invention (110) may comprise a plurality of controls (101, 102, 103, 104, 105, 106, 107A, 107B, 107C, 108, 109) on the front and top of the controller (110). The controller of the present invention (10) is advantageous as it additionally comprises at least one additional controls (120, 122 located on the side walls of the controller (110) in a position to be operated by the index fingers of a user (12).

20 Claims, 14 Drawing Sheets

(56) References Cited

U.S. PATENT DOCUMENTS

| | | | | |
|---|---|---|---|---|
| 2014/0323220 A1* | 10/2014 | Lee | ........................ | A63F 13/00 |
| | | | | 463/37 |
| 2015/0193017 A1 | 7/2015 | Igarashi et al. | | |
| 2016/0317918 A1* | 11/2016 | Gassoway | ............. | A63F 13/245 |
| 2016/0361635 A1* | 12/2016 | Schmitz | .................. | A63F 13/22 |
| 2017/0001109 A1* | 1/2017 | Dornbusch | ............. | A63F 13/24 |
| 2020/0016484 A1* | 1/2020 | Guerrero, Jr. | ............ | G05G 5/06 |

OTHER PUBLICATIONS

"Mad Catz MLG Pro Circuit Controller Review & Comparison," driph.com/words, http://driph.com/words/2012/01/mad-catz-mlg-pro-circuit-controller-review-comparison/ (Jan. 20, 2012).

Joe Robinson: "Mad Catz MLG Pro Circuit Controller Review," Gamewatcher, https://www.gamewatcher.com/editorials/mad-catz-mlg-pro-circuit-controller-review/11890# (Apr. 18, 2012).

Sean Buckley," Mad Catz MLG Pro Circuit Controller Review (PS3)," Engadget, https://www.engadget.com/2012/01/29/mad-catz-mlg-pro-circuit-controller-review-ps3/ (Jan. 29, 2012).

* cited by examiner

INPUT APPARATUS FOR A GAMES CONSOLE

PRIORITY

This application is a continuation of U.S. Ser. No. 16/621,333 filed on Dec. 11, 2019, which is the U.S. national stage entry under 35 U.S.C. § 371 of Intl. Pat. App. No. PCT/GB2018/051585 filed on Jun. 11, 2018, which claims priority from U.S. Ser. No. 62/518,239 filed on Jun. 12, 2017. The entire contents of Intl. App. No. PCT/GB2018/051585 and U.S. Ser. No. 62/518,239 and Ser. No. 16/621,333 are incorporated herein by reference.

TECHNICAL FIELD

The present invention relates to an input apparatus for a computer, such as, but not limited to, a games console, more particularly, but not exclusively the invention relates to, a hand held controller for a games console.

BACKGROUND

Controllers for most current games consoles are generally intended to be held and operated by the user holding the controller in both hands, such controllers are sometime referred to as "gamepads". A conventional controller will generally comprise a hard outer case with a plurality of controls mounted about the controller. Typically the controls include buttons, analogue control sticks, bumpers and triggers and are provided upon the front or the top of the controller.

An object of the present invention is to provide a controller having at least one additional control mounted to the controller. It is desirable that the controller is ergonomic, that a user can comfortably operate the control. It is also desirable that the additional control is readily accessible.

The present invention seeks to overcome or at least mitigate the problems of the prior art.

SUMMARY

A first aspect of the present disclosure provides an input apparatus for a computer comprising an outer case having a front face, a top face and opposing side walls, the apparatus comprising at least one control located on the top face of the controller, the controller being shaped to be held in both hands of a user such and the user's index fingers are positioned to operate the at least one control located on the top of the controller; the controller further comprises at least one additional control located on at least one of the opposing side walls of the controller in a position operable by an intermediate portion of the user's index finger.

Optionally, at least one additional control comprises a switch mechanism disposed in an interior of the outer case.

Optionally, at least one additional control comprises an actuator pivotally mounted in cradle disposed within the interior of the outer case.

Optionally, at least one additional control comprises a trunnion mounted in the cradle, the cradle comprising a first portion provided by a portion of the outer case and a second portion provided by a chassis member.

Optionally, at least one additional control comprises at least one limb coupling the trunnion to a body portion.

Optionally, the body portion extends through an opening in the outer case.

Optionally, a cover is mounted to the body portion and wherein at least a portion of the cover extends through the opening in the outer case.

Optionally, at least one additional control comprises a sensor mounted to said one of the opposing side walls of the controller.

Optionally, the at least one additional control is disposed proximate the at least one control located on the top of the controller.

Optionally, the input apparatus is a hand held controller for a games console and further comprises:
a plurality of controls located on a front face and top face of the controller;
the controller being shaped to be held in both hands of a user such that the user's thumbs are positioned to operate controls located on the front of the controller and the user's index fingers are positioned to operate controls located on the top of the controller.

A second aspect of the present disclosure provides an input apparatus for a computer comprising an outer case having a front face, a top face and opposing side walls, the apparatus comprising at least one control located on the top face of the controller, the controller being shaped to be held in both hands of a user such and the user's index fingers are positioned to operate the at least one control located on the top of the controller; the controller further comprises at least one additional control located on at least one of the opposing side walls of the controller, the at least one additional control being disposed proximate at least one control located on the top of the controller.

A third aspect of the present disclosure provides a hand held controller for video games console comprising an outer case having a front face, a top face and opposing side walls, the apparatus comprising at least one control located on the top face of the controller, the controller being shaped to be held in both hands of a user such and the user's index fingers are positioned to operate the at least one control located on the top of the controller; the controller further comprises at least one additional control located on at least one of the opposing side walls of the controller, the at least one additional control being disposed proximate at least one control located on the top of the controller.

A fourth aspect of the present disclosure provides an input apparatus for a computer comprising an outer case having a front face and a top face and having a plurality of controls located on the front face and the top face of the controller; the controller being shaped to be held in both hands of a user such that the user's thumbs are positioned to operate controls located on the front of the controller and the user's index fingers are positioned to operate controls located on the top of the controller wherein the controller comprises a front panel mounted to a chassis member, the chassis member comprising at least one chamber, the chamber comprising an electrical connector for coupling to an electrical device mountable in the chamber, wherein the chamber is provided in a handle on the controller.

A fifth aspect of the present disclosure provides input apparatus for a computer comprising an outer case having a front face and a top face and having a plurality of controls located on the front face and the top face of the controller; the controller being shaped to be held in both hands of a user such that the user's thumbs are positioned to operate controls located on the front of the controller and the user's index fingers are positioned to operate controls located on the top of the controller wherein the controller comprises a front panel detachably mounted to a chassis member, the chassis member comprising at least one chamber, the chamber comprising a removable haptic feedback module.

Optionally, the controller comprise a first handle and a second handle, and a first chamber is provided in the first handle and a second chamber is provided in the second chamber, each of the first and second chambers comprising a removable haptic feedback module.

Optionally, the removable haptic feedback module is mounted in a housing, and comprises at least one first electrical contact in electrical communication with at least one second electrical contact mounted in a wall of the chamber.

Optionally, the input apparatus comprises a back panel mounted to the chassis member.

A sixth aspect of the present disclosure provides an input apparatus for a computer comprising an outer case having a front face and a top face and having a plurality of controls located on the front face and the top face of the controller; the controller being shaped to be held in both hands of a user such that the user's thumbs are positioned to operate controls located on the front of the controller and the user's index fingers are positioned to operate controls located on the top of the controller wherein the controller comprises a front panel detachably mounted to a chassis member, the chassis member comprising at least one chamber having at least one first electrical contact mounted in a wall of the chamber, the chamber comprising a removable module, the module comprising a housing, having at least one second electrical contact in electrical communication with at least one first electrical contact.

Optionally, the controller comprises a first handle and a second handle, and a first chamber is provided in the first handle and a second chamber is provided in the second chamber, each of the first and second chambers comprising a removable module.

A seventh aspect of the present disclosure provides a removable haptic feedback module for use with an input apparatus for a computer comprising:

an outer case having a front face and a top face;
a plurality of controls located on the front face and the top face of the controller; the controller being shaped to be held in both hands of a user such that the user's thumbs are positioned to operate controls located on the front of the controller and the user's index fingers are positioned to operate controls located on the top of the controller;
a chassis member comprising at least one chamber having at least one first electrical contact mounted in a wall of the chamber; and
a front panel detachably mounted to the chassis member;
wherein the removable haptic feedback module comprises:
a housing; and
a haptic feedback device mounted in the housing,
wherein the housing comprises at least one second electrical contact for electrical communication with at least one first electrical contact.

An eighth aspect of the present disclosure provides an input apparatus for a computer comprising an outer case having a front face and a top face and having a plurality of controls located on the front face and the top face of the controller; the controller being shaped to be held in both hands of a user such that the user's thumbs are positioned to operate controls located on the front of the controller and the user's index fingers are positioned to operate controls located on the top of the controller wherein the controller comprises a first handle module detachably mounted to a chassis member, the first handle module comprising at least one chamber having electrical device disposed therein, first handle module comprises a fastening mechanism for mounting first handle module to the chassis member.

Optionally, the first handle module comprises haptic feedback device.

Optionally, the first handle module is in electrical communication with one or more electrical components mounted to the chassis member.

Optionally, the controller comprises a second handle module detachably mounted to a chassis member, the second handle module comprising at least one chamber having electronic device disposed therein, second handle module comprises a fastening mechanism for mounting second handle module to the chassis member.

A ninth aspect of the present disclosure provides a removable handle module for use with an input apparatus for a computer comprising:

an outer case having a front face and a top face;
a plurality of controls located on the front face and the top face of the controller; the controller being shaped to be held in both hands of a user such that the user's thumbs are positioned to operate controls located on the front of the controller and the user's index fingers are positioned to operate controls located on the top of the controller;
a chassis member having at least one first electrical contact mounted in a wall of the chamber; and
wherein the removable handle module comprises:
a housing; and
an electrical device mounted in the housing,
wherein the housing comprises at least one second electrical contact for electrical communication with at least one first electrical contact.

Further features and advantages of the present invention will be apparent from the specific embodiments illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION

Figure 1A:
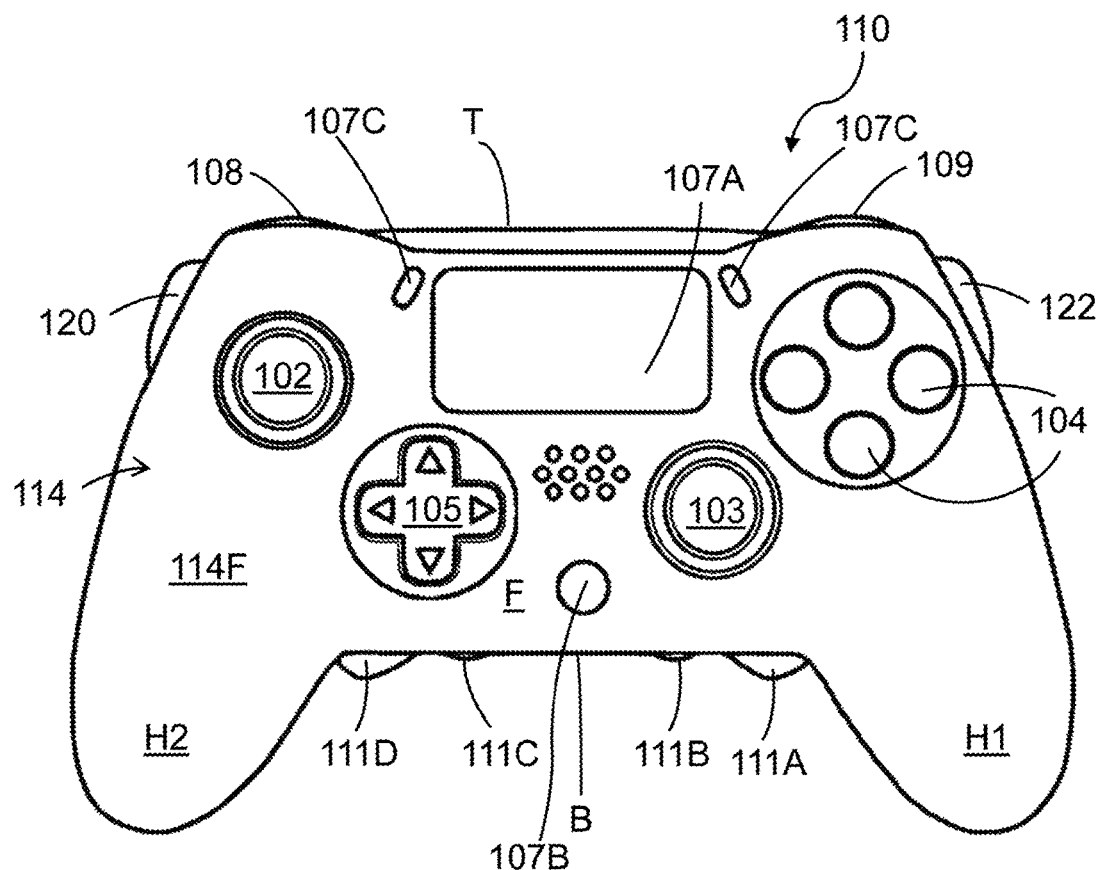
FIG. 1A is a schematic illustration of the front of an input apparatus for a games console controller according to an embodiment of the present disclosure.

Detailed descriptions of specific embodiments of an input apparatus, a controller, an additional control component and a method are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the input apparatus, the controller, the additional control component and the method described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention Referring to FIG. 1A there is shown a plan view from above of the front of an input apparatus 110 for a use with a computer. The input apparatus 110 illustrated takes the form of a controller 110 or game pad 110 for use with a video games console or similar. In other embodiments the input apparatus 10 may take the form of a handheld games console or other mobile device such as but not limited to a smartphone, tablet computer, phablet or the input apparatus 110 may be an accessory device (such as, but not limited to, a sleeve or case) for use with such a mobile device.

Figure 1B:
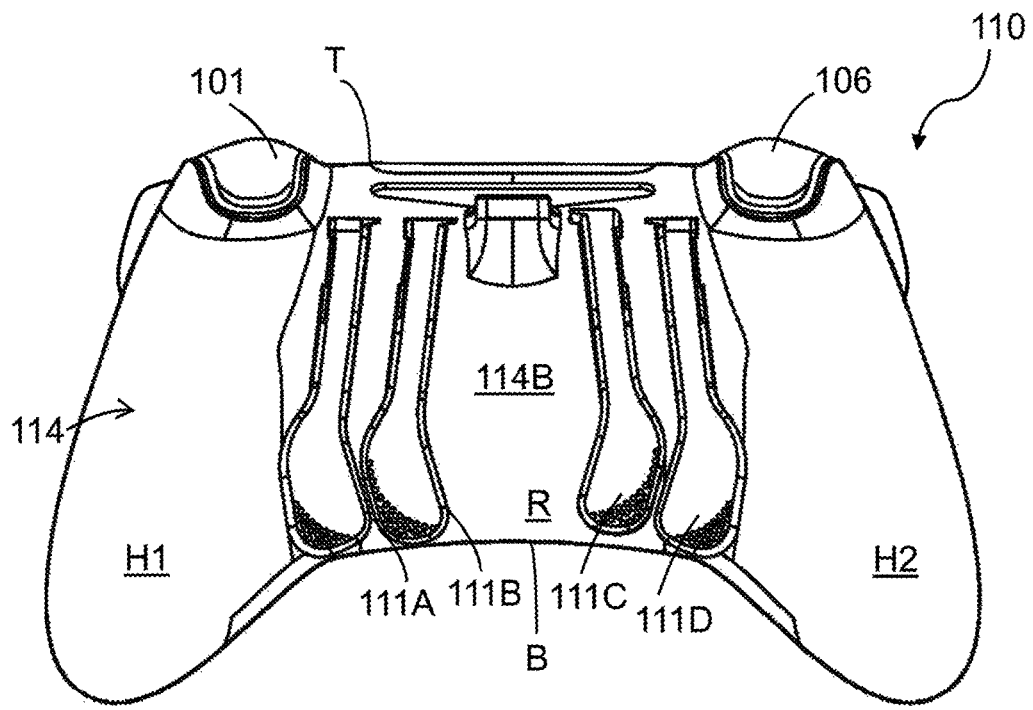
FIG. 1B is a plan view from below of the rear of the input apparatus of FIG. 1A, the apparatus comprising additional controls mounted thereto.

The apparatus or controller 110 comprises an outer case or shell 114. The case 114 may comprise one or more panels fitted together and or mounted to a chassis member. The case 114 may comprise a front body panel 114F and a rear body panel 114B (see FIG. 1B). The outer case 114 comprises a void in which electronic components (such as, but not limited to, switches 138 and/or sensors, see FIG. 5) are located.

The apparatus or controller 110 comprises a plurality of controls which are mounted to the front F and to the top T of the controller 110. As used herein the term "front" refers to an upper surface of the controller 110 when in normal use held in both hands, whilst the term "top" refers to a leading edge of the controller 110 which typically faces away from a user when held in both hands. A rear or back R of the controller opposes the "front" and typically will form a lower surface, whilst the term "bottom" B refers to a trailing edge of the controller 110 which typically faces towards the user when held in both hands. The controller 110 comprises a plurality of buttons which when activated initiate a specific action or control function. The controller 110 comprises at least one omnidirectional control stick or button which is operable to provide directional input.

Specifically, in the illustrated example shown, the controller 110 comprises first, left, and second, right, analogue control sticks, also known as thumb sticks 102, 103. The first left 102 and second right 103 thumb sticks normally control movement and are intended to be operated by the user's left and right thumbs respectively. Left and right thumb sticks 102, 103 are mounted to the front face F of the controller 110. The left thumb stick 102 is located in a forward (or upper i.e. nearer the top T of the controller 110) left region of the front face F; and right thumb stick 103 is located in a rearward (or lower i.e. nearer the bottom B of the controller 110) right region of the front face F. There are four buttons 104, located on a forward (or upper i.e. nearer the top T of the controller 110) right portion of the front face F of the controller 110. The four buttons 104 normally control additional actions and are intended to be operated by the user's right thumb. There is a direction pad 105 located on the rearward (or lower) left portion of the front face F of the controller 110. The direction pad 105 is intended to be operated by the user's left thumb, typically either as an alternative to the left thumb stick 102 or to provide additional action controls. A left shoulder button or bumper 108 and a right shoulder button or bumper 109 are located on the top face T of the controller 110. A left trigger 106 and a right trigger 101 are also located on the top face T of the controller 10 (see FIG. 1B). The left and right triggers 106, 101 are typically operated by a user's index fingers. The left and right bumpers 8, 9 may also be operated by a user's index fingers. The left and right triggers 106, 101 may be analogue in nature, or may comprise a plurality of discrete digital states, that is to say the input control may be dependent upon the degree of depression or displacement of the trigger body.

The controller 110 may comprise one or more additional input buttons 107A, 107B, 107C, the buttons 107A, 107B, 107C may take the form of one or more digital or analogue buttons, or may be in the form of a touch pad or touch screen.

In order to operate any of the buttons 104 a user will normally remove their right thumb from the right thumb stick 103 so as to depress one or more of the buttons 104. Switching between the right thumb stick 103 and the buttons 104 takes time since the user's thumb must traverse the distance therebetween. This may also cause a loss of, or reduction in, control in some games because the user has to relinquish control over the right thumb stick 103 in order to control the buttons 104. This may be a particular problem in games where the right thumb stick 103 is used for aiming. A similar problem may arise in games where the direction pad 105 provides additional actions and the user has to remove their left thumb from the left thumb stick 102 in order to operate the direction pad 105.

The controller 110 may comprise one or more additional controls 111A, 111B, 111C, 111D mounted to the rear R or back of the apparatus 110, where the rear R or back face is opposite the top face F (the face F to which the buttons 104, left and right thumb sticks 102, 103 and direction pad 105 are mounted).

In the illustrated apparatus 10, the apparatus comprises four additional controls 111A, 111B, 111C, 111D. In other embodiments, more or fewer additional controls 111A, 111B, 111C, 111D may be provided. The additional controls 111A, 111B, 111C, 111D, also referred to herein as paddle levers. Each may comprise an elongate member, that is to say the member comprises a first end and a second end the distance between the first and second ends is greater than a width of the member. The member may be bent, twisted or folded in one or more directions. The paddle levers 111A, 111B, 111C, 111D may be orientated such that at least a portion of the member is substantially parallel with respect to one of a first and second handle portions H1, H2 of the controller 110. The members are each positioned to be operable by the middle, ring or little fingers of a user. These are the fingers normally used to grasp first and second handle portion H1, H2 which thus brings them into proximity with the rear face R of the controller 110.

Figure 1C:
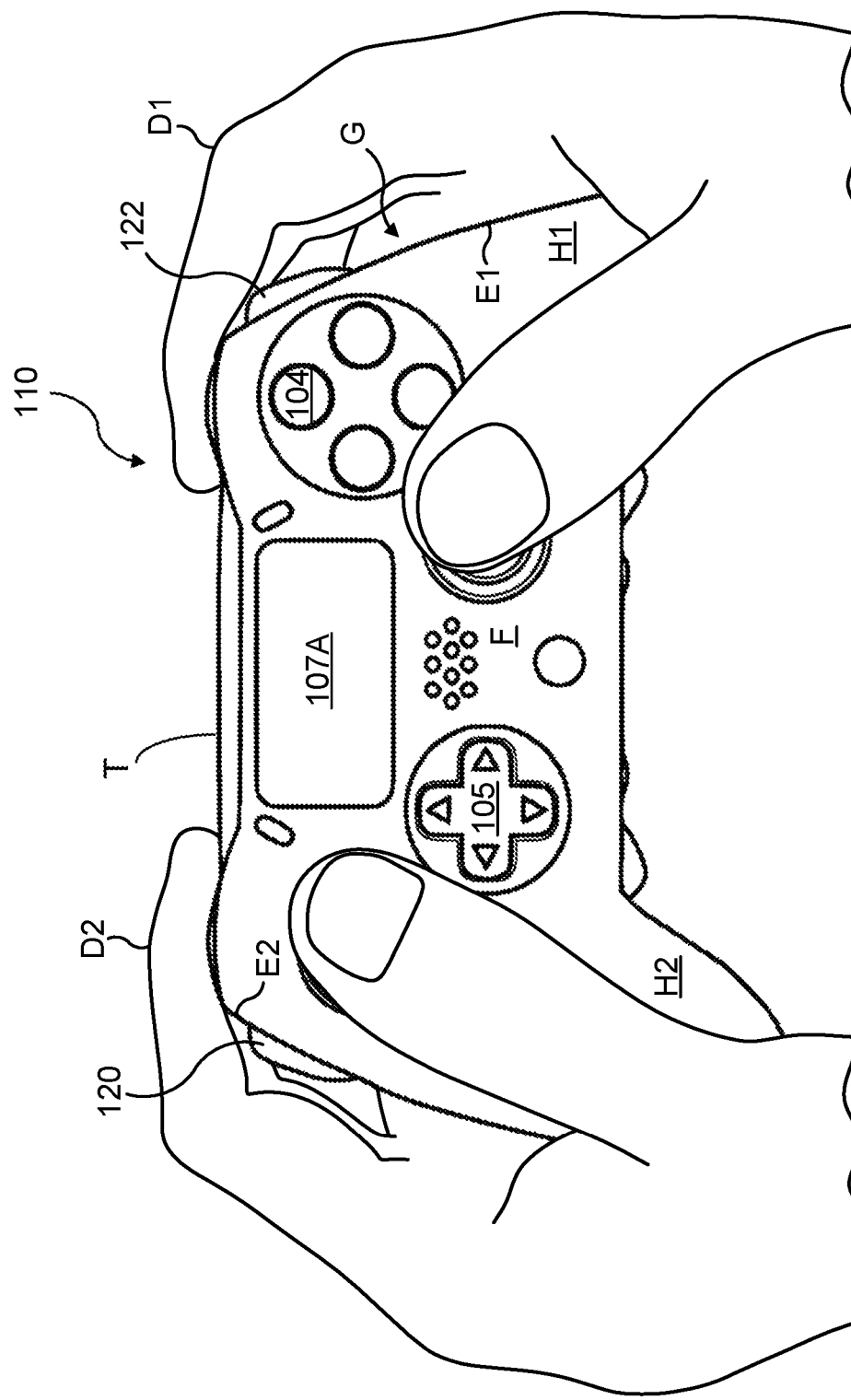
FIG. 1C is a schematic illustration of an input apparatus for a games console controller being held by a user.
Figure 2A:
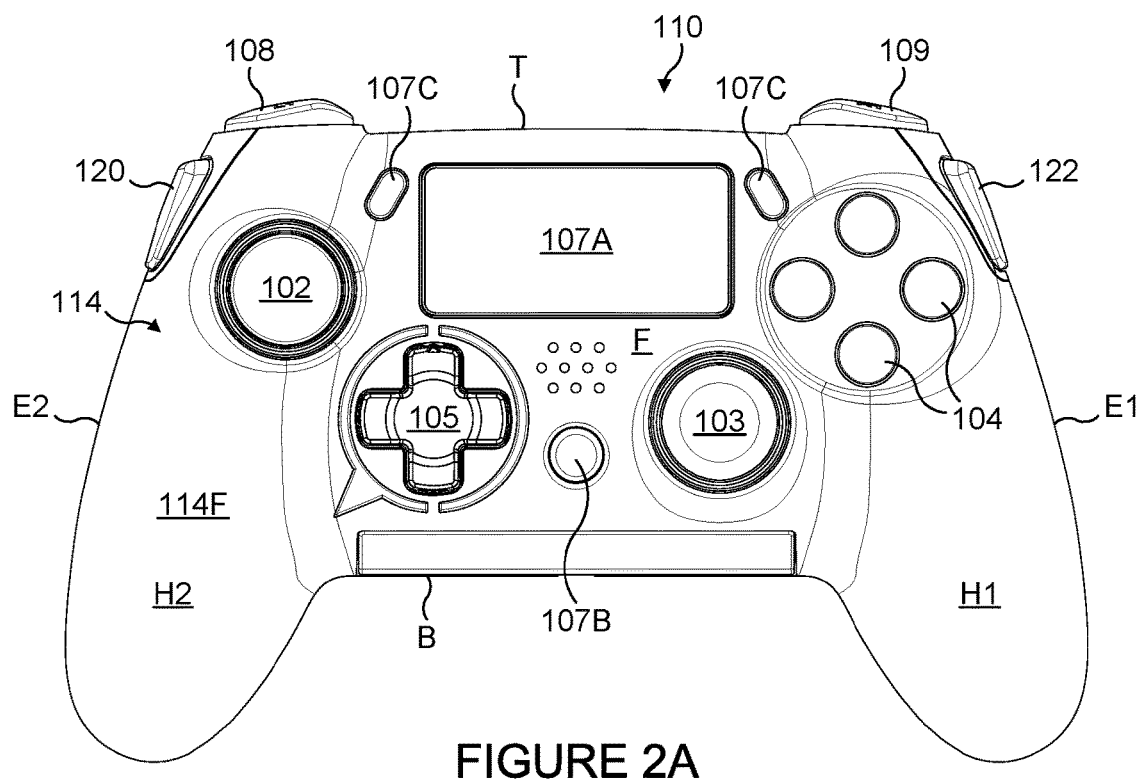
FIG. 2A is a perspective view from above of the front of an input apparatus of FIG. 1A.
Figure 2B:
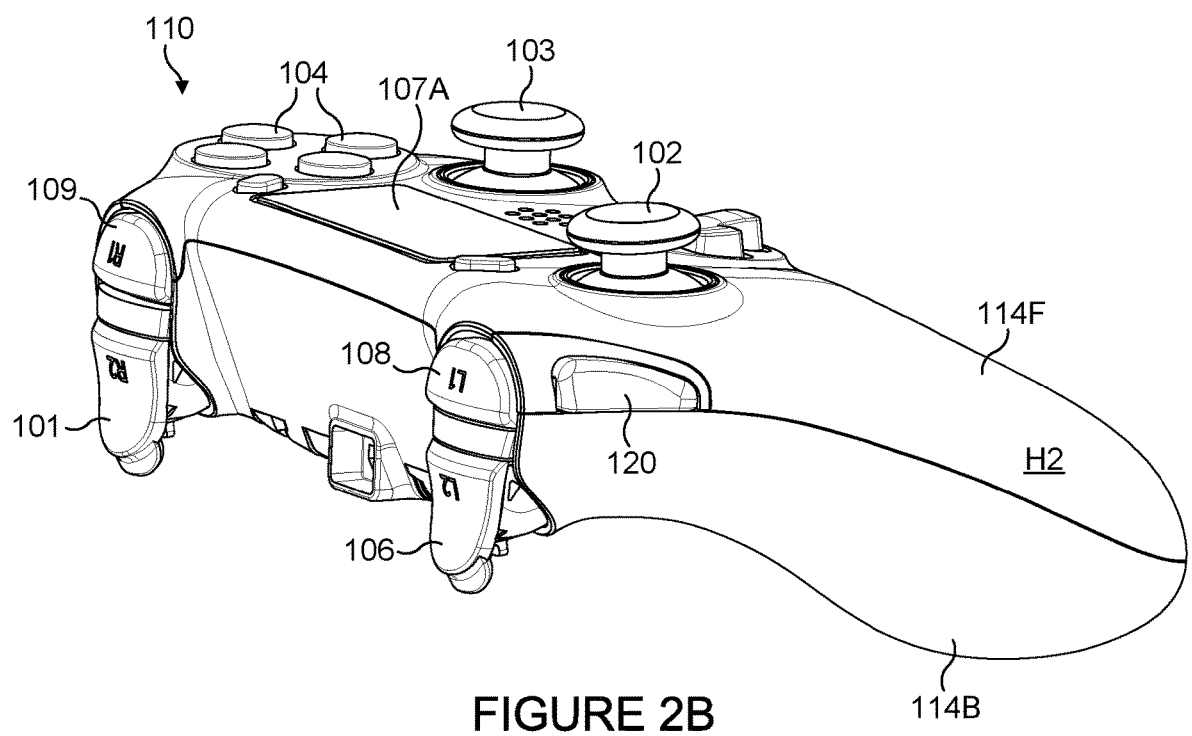
FIG. 2B is an alternative perspective view the input apparatus of FIG. 1A.
Figure 3B:
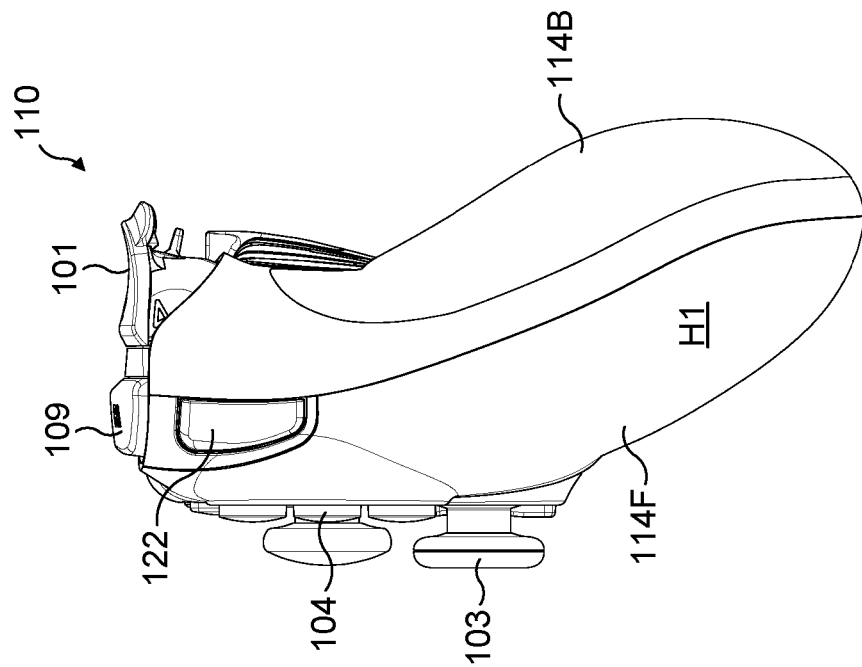
FIGS. 3A and 3B are first and second side views respectively of the input apparatus shown in FIGS. 1A and 1B.
Figure 3A:
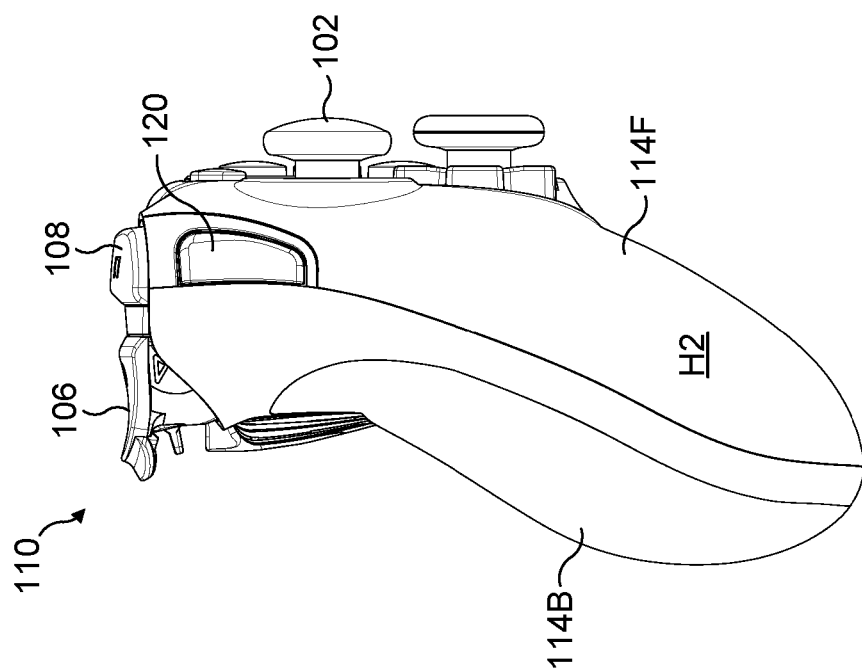
Figure 4:
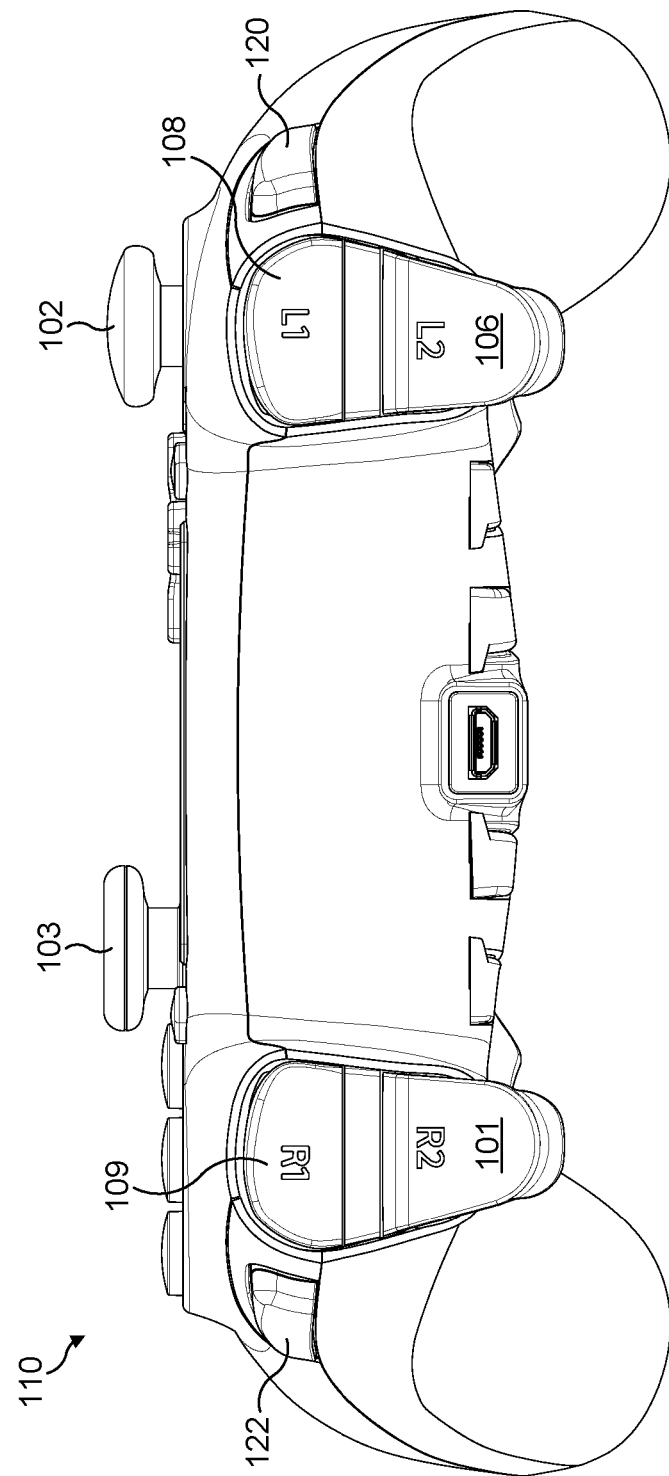
FIG. 4 is a top view top of the input apparatus of FIG. 1A.

In order to operate the controls mounted upon the top T of the controller 110 a user will normally wrap their index fingers about the side edges or walls E1, E2 of the controller case 114, as shown in FIG. 1C. In FIG. 1C the index finger D1, D3 are bent or crooked about forward or leading corners of the controller 110.

The user can operate either the left shoulder button 108 or left trigger 106 with the index finger D2 of their left hand and can operate either the right shoulder button 109 or right trigger 101 with the index finger D2 of their right hand (see FIG. 1C).

The user may place the pad of the end of their index fingers on the controls on the top of the controller 110. When doing so the user index fingers may leave a gap G between side walls E1, E2 of the controller case 114 and the adjacent index finger D1, D2.

The present disclosure provide an actuator or additional control 120, 122 upon at least one of the side walls E1, E2 of the controller case 114 proximate the top or leading edge T of the controller 110. The additional controls 120, 122 may be disposed in an upper region of the side walls E1, E2 of the controller case 114m that is to say proximate the front F of the controller 110. The additional controls 120, 122 are disposed in the crook of a respective one of the index fingers D1, D2, the additional controls 120, 122 may at least partially fill the gaps G.

The additional control 120, 122 are arranged to be operated by a user engaging or pressing the control with one of the phalanges of the index finger D1, D2, preferably the user's proximal phalanx or rather the fleshy part thereabout.

In some embodiments, the additional control 120, 122 may be operated by the middle phalanx of the index finger D1, D2. This may be more common when the users hand is smaller in size.

In this way the additional controls 120, 122 are operable by an intermediate portion of the user's index finger, wherein the intermediate portion is disposed between the finger pad or end of the finger and the metacarpophalangeal joint.

In contrast to the shoulder buttons 108, 109 and the triggers 101, 106 which are operated by bending the index finger D1, D2, the additional controls 120, 122 may be operated by a straightening action of the index finger D1, D2. In this way the user's proximal phalanx is brought towards the additional control 120, 122 so as to activate the control 120, 122.

In this way the user may operate the additional controls 120, 122 when their index finger D1, D2 is at rest upon or aligned with the shoulder button 108, 109 or 122 or when their index finger D1, D2 is at rest upon or aligned with the triggers 101, 106.

The user may operate the additional controls 120, 122 without altering the alignment of their index finger with whichever of the front controls, shoulder button or trigger, that their index finger is poised over.

The additional control 120 may replicate the function operated by either the left shoulder button 108 or left trigger 106. The additional control 120 may replicate the function of one of the controls disposed on the front of the controller 110 for example, but not limited to, buttons 104.

The additional control 122 may replicate the function operated by either the right shoulder button 109 or right trigger 101. The additional control 122 may replicate the function of one of the controls disposed on the front of the controller 110 for example, but not limited to, buttons 104.

Alternatively, the additional controls 120, 122 may control a new command functions.

In some embodiments, activation of one of the additional controls 120, 122 may change the command function or operation initiated by one of the other controls provided on the controller. When said one of the additional controls 120, 122 is in a first, "on" state the other control when actuated may initiated a first command function, whereas when said one of the additional controls 120, 122 is in a second, "off" state the other control when actuated may initiated a second, different, command function.

FIGS. 5 to 10 show further views of the additional controls 120, 122 and a mounting structure. The additional controls are substantially similar in construction albeit mirror images of each other.

Figure 5:
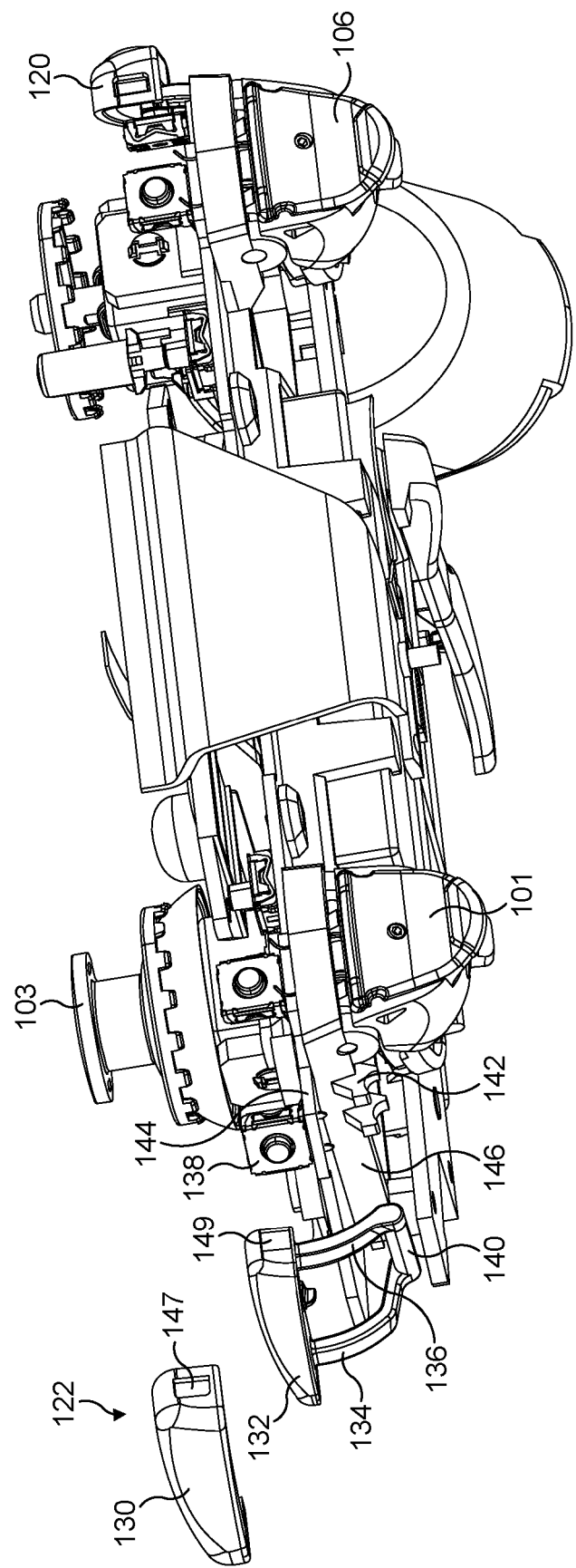
FIGS. 5 to 7 are exploded perspective views of the input apparatus shown in FIGS. 1A and 1B in which a number of components such as, but not limited to, front and back case panels have been removed for illustrative purposes.
Figure 6:
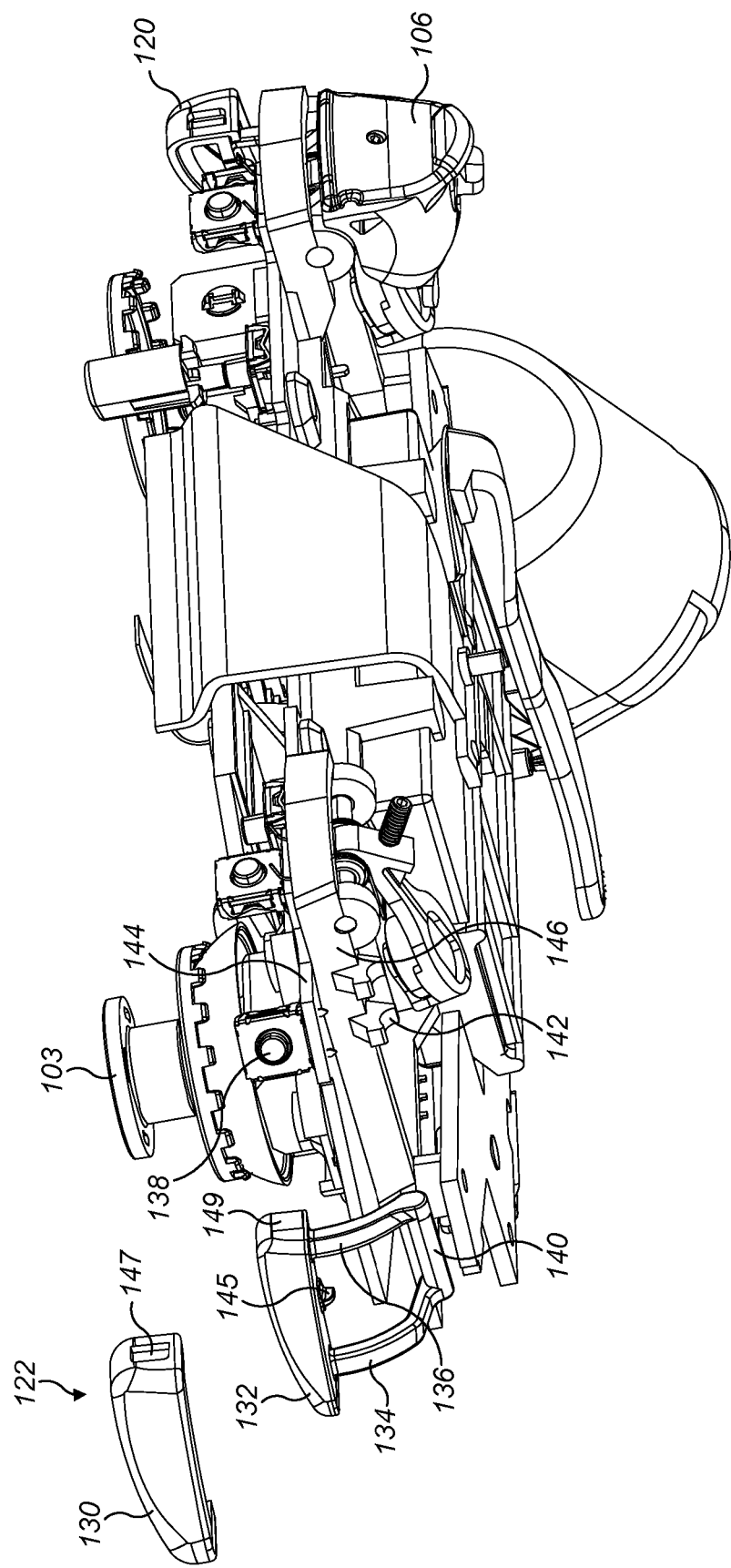
Figure 7:
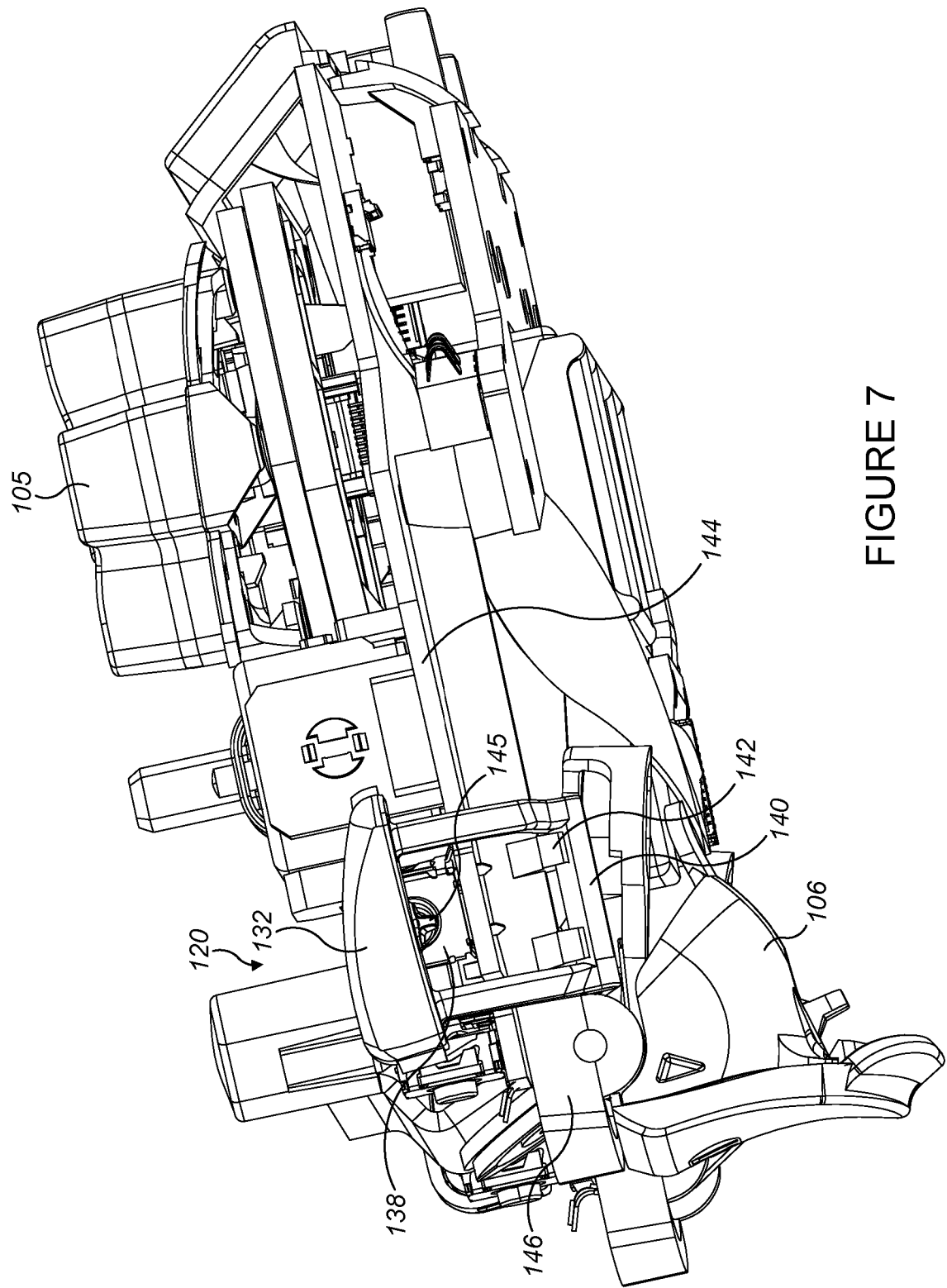

FIGS. 5 and 6 are exploded views of the second additional control 122. FIG. 7 is a perspective view of a partially assembled first addition control 120.

The additional controls comprise a main body 132 and a pin or shaft forming a trunnion 140. The trunnion 140 is coupled to the main body 132 by at least one limb 134, 136. The illustrated embodiment comprises a pair of limbs. The limbs 134, 136 are mounted to opposing ends of the trunnion 140 and to a base of the man body 132.

The limbs 134, 136 are crooked or nonlinear. The limbs 134, 136 may be arcuate or substantially "L" shaped. In this way the trunnion 140 is offset from the main body 132 in a vertical direction and in a horizontal direction. The vertical direction is a first direction which extends between the front F and the back B of the controller 110, irrespective of the actual orientation of the controller 110.

The horizontal direction is a second direction which extends between side walls E1, E2 of the controller 110, irrespective of the actual orientation of the controller 110.

The controller 110 comprises a chassis 146 to which the triggers 101, 106 are mounted. A circuit board 144 is mounted to the chassis 142. The circuit board 144 comprises a plurality of electrical or electronic components mounted thereto.

A first switch 138 is mounted to the circuit board 144, the additional control 122 is arranged to activate the first switch 138 to initiate a command function associated therewith. The first switch is mounted orthogonally to the circuit board 144. In one embodiment a right angle Tact Switch may be employed.

The chassis 146 comprises a first or upper portion 142 of a cradle in which the trunnion 140 is mounted.

Figure 8:
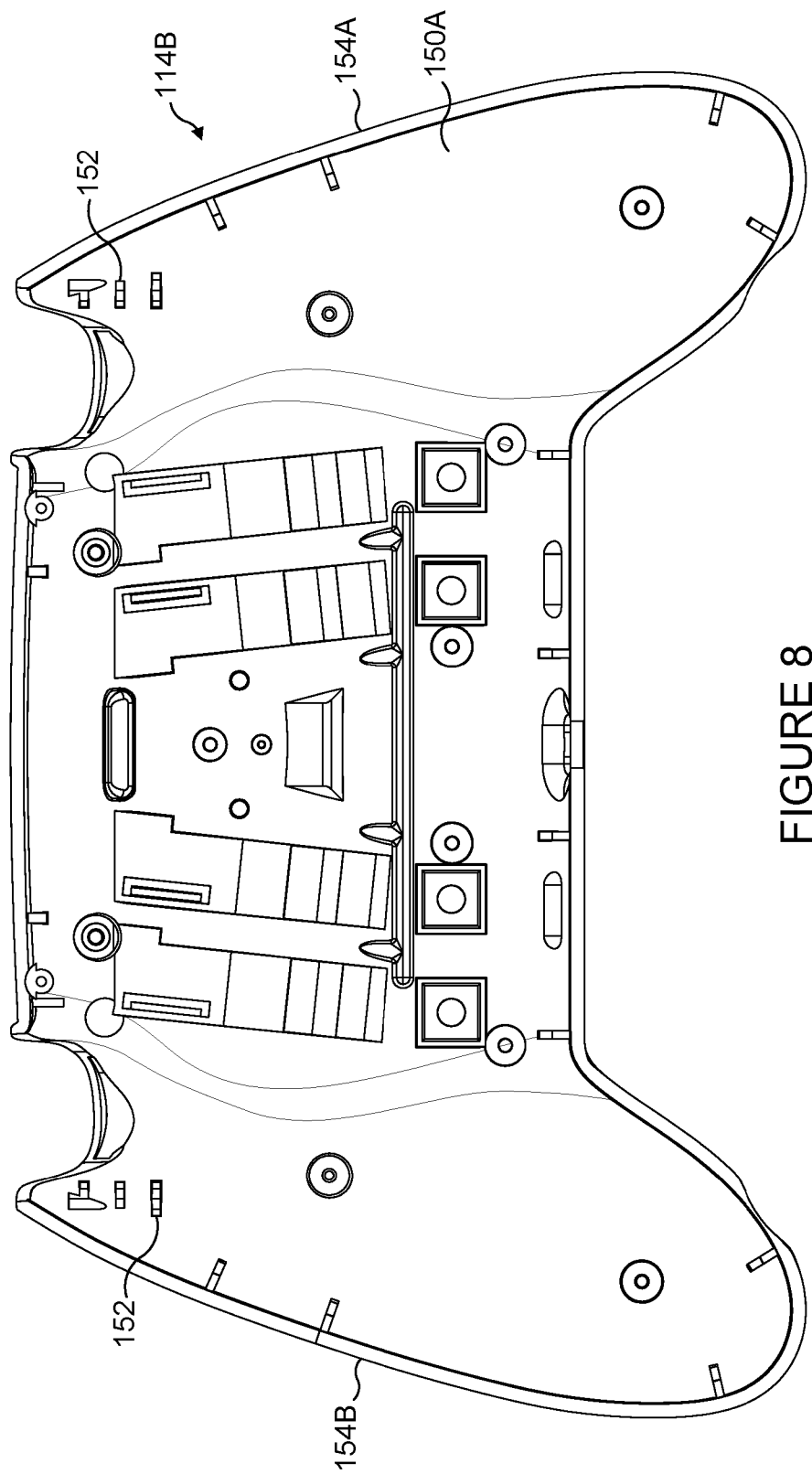
FIG. 8 a plan view of a back case panel of the input apparatus of FIG. 1A showing an interior thereof.
Figure 9A:
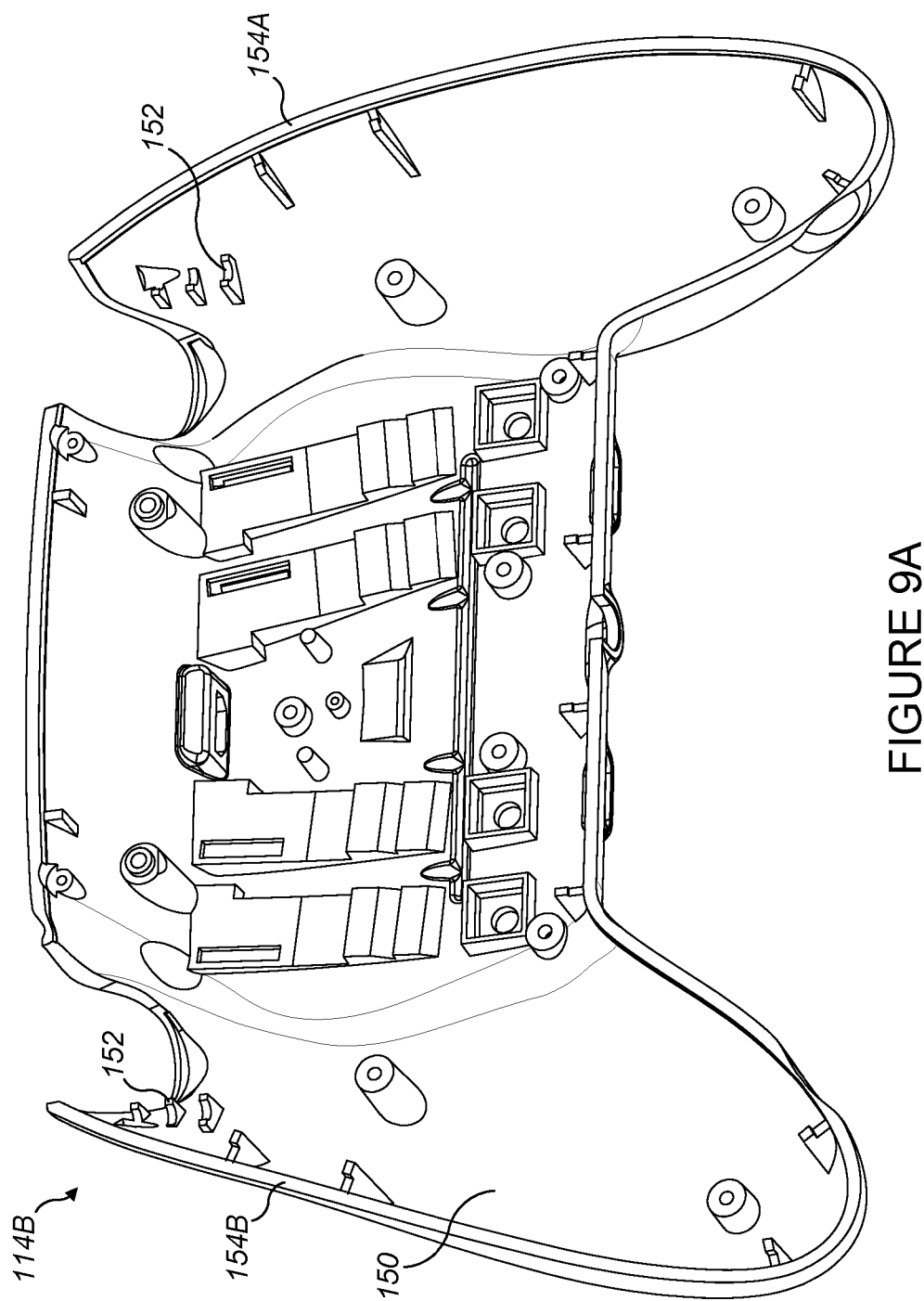
FIG. 9A is a perspective view of the back case panel of FIG. 8.
Figure 9B:
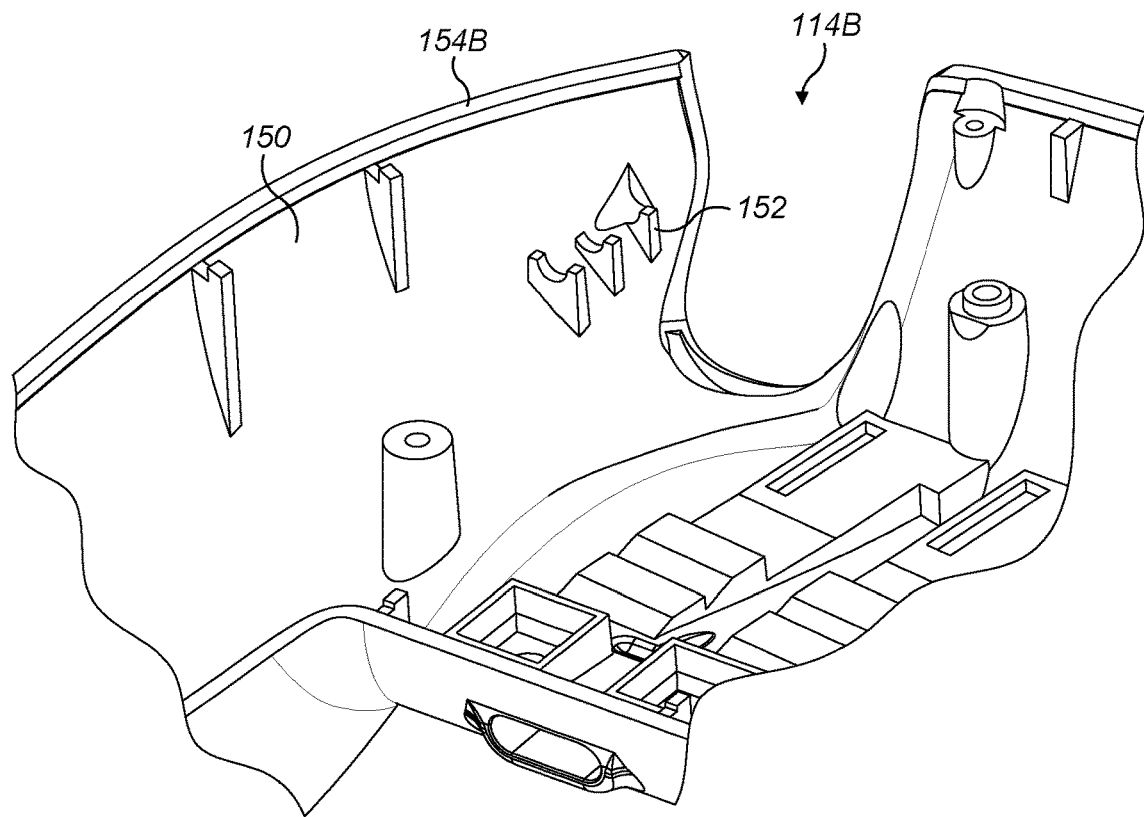
FIGS. 9B and 10 are a perspective views of a portion of the back case panel of FIG. 8.
Figure 10:
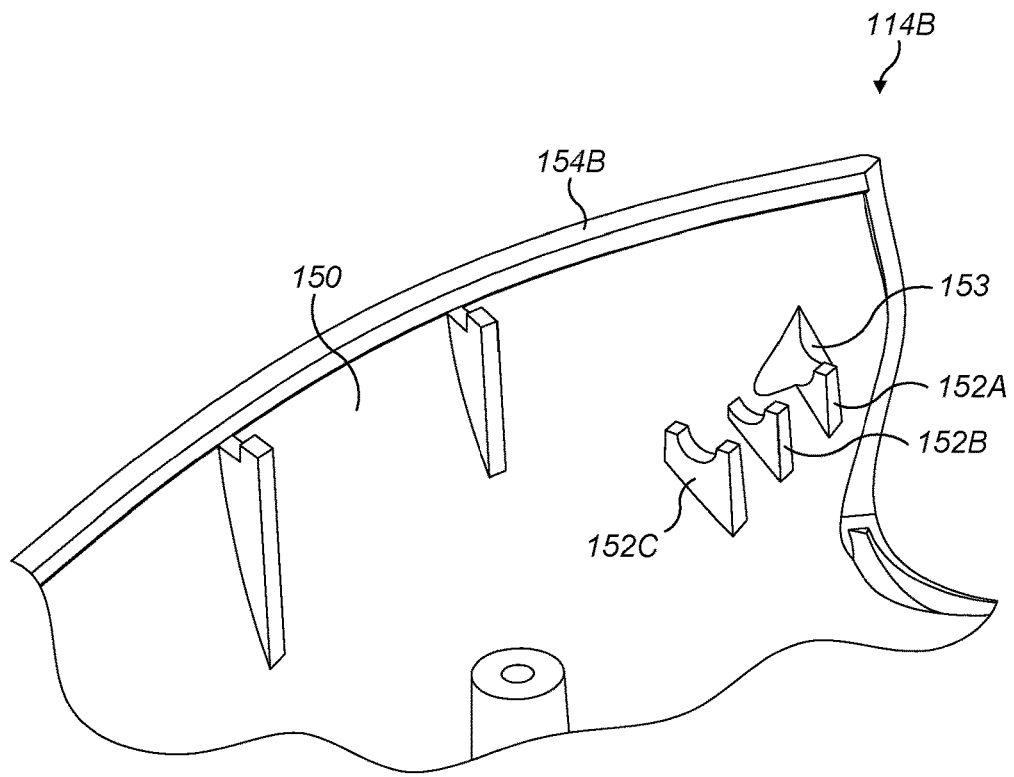

The back case panel 114B comprises a second or base portion 152 of the cradle, see FIGS. 8 to 10.

The cradle is arranged to be disposed below the switch 138. That is to say the switch 138 and cradle are disposed on opposing sides of the circuit board 144.

The main body 132 may comprise a protuberance or projection 145 arranged to interact with an actuator of the switch 138.

The additional control 122 may comprise a cover 130 mounted to the main body 132. The cover 130 may be mounted to the main body by a clip or fastening mechanism 147/149 such as but not limited to a latch mechanism comprising a latch 149 and a receiver 147. In other embodiments other fastening mechanism may be employed.

Providing a cover 130 readily allows one or more characteristics of the external portion of the addition control 120, 122 to be customised such as, but not limited to, the shape, size, colour, appearance, material or texture.

In an assembled condition the trunnion is at rest in the base portion 152 of the cradle provided by the back case panel 114B. The upper portion 142 of the cradle provided by the chassis 146 is disposed over the trunnion 140 so as to retain the trunnion in the cradle.

The base portion of the cradle 152 may be provided by at least one support 152A, 152B, 152C extending from an internal surface of the back case panel 114B into the interior of the back case panel 114B.

The base portion of the cradle 152 may be provided by a recess 153 provided in a side or base wall of the back case panel 114B.

In an alternative embodiment the switch mechanism 138 and control actuator 120, 122 may be replaced with a sensor mounted on the side walls E1, E2 of the controller 110 in same the location as the control actuators 120, 122. The sensor may take the form of a capacitive or resistive touch pad. In other embodiments it may be an optical sensor. The sensor may be arranged to be substantially flush with the outer surface of the controller side walls. This may reduce the likelihood of accidental activation of the additional control 120, 122. The sensor may be activated by bringing the users finger into close proximity of touching contact with the sensor.

Figure 11:
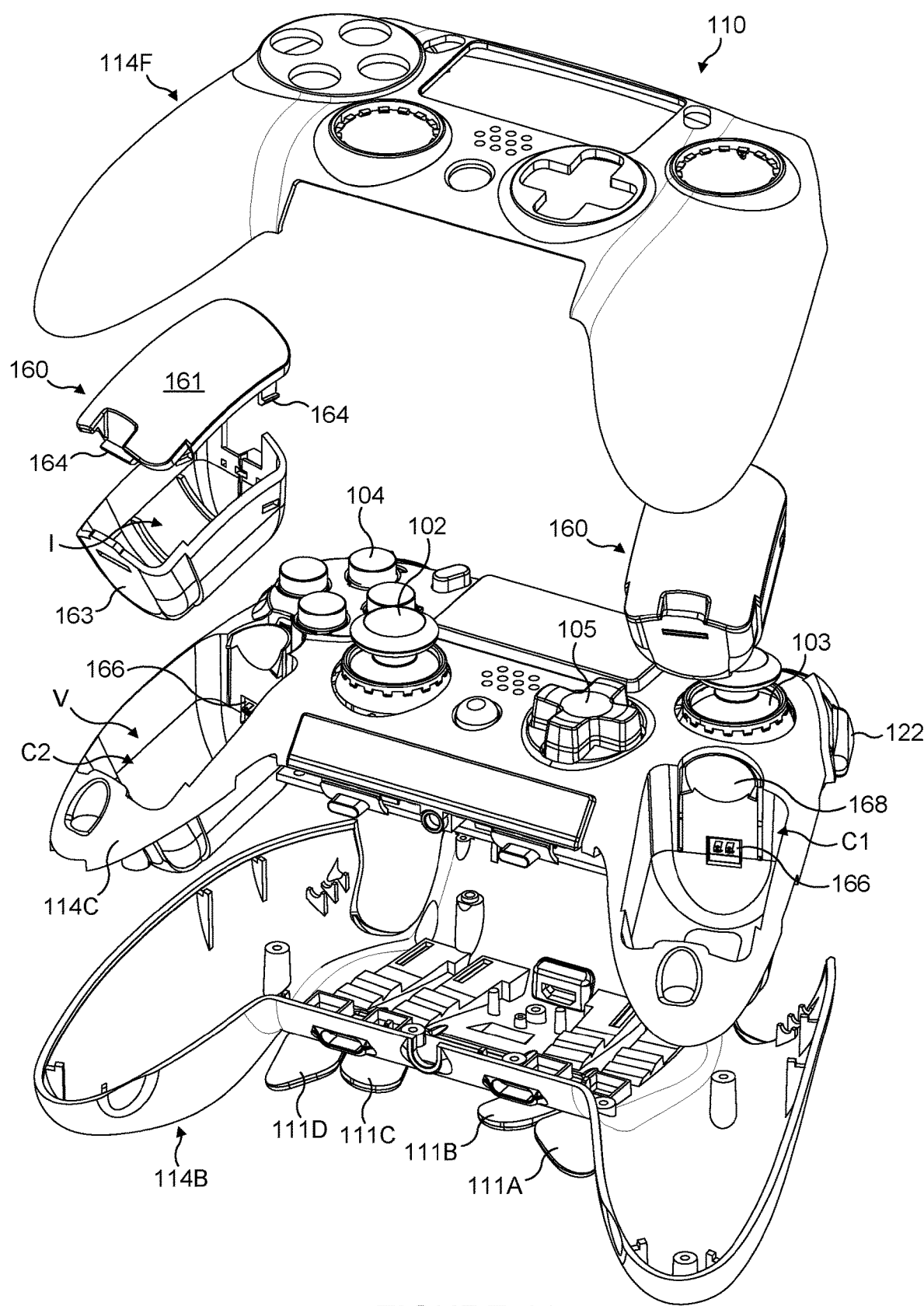
FIG. 11 is an exploded perspective view of an input apparatus for a games console controller according to another embodiment of the present disclosure.

Referring now to FIG. 11, there is shown an alternative embodiment of the present disclosure. The alternative embodiment shares many common features with the first embodiment and therefore only the differences from the embodiment illustrated in FIGS. 1A to 10 will be described in any greater detail.

FIG. 11 illustrates an exploded view from above of an alternative input apparatus or controller 110 for a use with a computer. The controller 110 comprises first, left, and second, right, analogue control sticks, also known as thumb sticks 102, 103, which normally control movement and are intended to be operated by the user's left and right thumbs respectively, left and right thumb sticks are mounted to the front face of the controller 110, the left thumb stick is located in rearward (or lower-nearer the bottom face of the controller 110) left region of the front face and right thumb stick is located in forward (or upper-nearer the top face of the controller 110) right region of the front face. There are four buttons 104, located on a forward (or upper-nearer the top face of the controller 110) left portion of the front face of the controller 10, which normally control additional actions and are intended to be operated by the user's left thumb. There is a direction pad 105 located on the rearward (or lower) right portion of the front face of the controller 110. The direction pad 105 is intended to be operated by the user's right thumb, typically either as an alternative to the right thumb stick 103 or to provide additional actions. A left shoulder button or bumper and a right shoulder button or bumper are located on the top face of the controller 110. A left trigger and a right trigger are also located on the top face of the controller 110. The left and right triggers are typically operated by a user's index fingers. The left and right bumpers may also be operated by a user's index fingers. The left and right triggers may analogue in nature, or may comprise a plurality of discrete digital states, that is to say the input control is dependent upon the degree of depression or displacement of the trigger body.

The controller comprises at least one paddle lever control 111A, 111B, 111C, 111D mounted to the back of the controller 110 substantially as described with reference to the embodiment of FIGS. 1A to 10.

The controller comprises at least one additional index finger control 122 mounted to the side walls of the controller 110 substantially as described with reference to the embodiment of FIGS. 1A to 10.

The controller 110 comprises a chassis or frame member 114C to which a front case panel 114F and rear case panel 114b are mounted.

The frame member 114C comprises a first chamber C1 arranged to be disposed in the first handle portion H1 of the controller 110.

The frame member 114C comprises a second chamber C2 arranged to be disposed in the second handle portion H2 of the controller 110.

The first chamber C1 and second chamber C2 are substantially the same in construction and will be described by reference to the second chamber C2. The second chamber C2 defines at least in part a void V for receiving a removable module 160 in the form of a haptic feedback module. The haptic feedback module may take the form of a rumble or vibration module. In some embodiments the vibration module comprises an electric motor having an eccentric weight mounted to a drive shaft. Rotation of the motor causes the user to experience vibrations as the eccentric weight is moved.

The removable module 160 comprises a housing comprising a base 163 having bottom wall, opposed side walls and opposed end walls defining an interior I and a lid 161 forming a top wall. The lid is mounted to the base 163 by a fastening mechanism such as, but not limited to, a latch mechanism 164.

The vibration module is mounted in the interior of the housing. The removable module 160 comprises at least one first electrical contact for electrical communication with at least one second electrical contact provided in the first or second chamber C1, C2. The at least one first electrical contact may be formed by one or more pins or spring contacts passing though apertures in the housing. Each of the at least one first electrical contacts may be resiliently biased to maintain electrical engagement with one of the at least one second electrical contacts.

The controller 110 may comprise a securing mechanism for holding the haptic feedback module 160 in the respective one of the first and second chambers C1, C2. The securing mechanism may be mechanical such as releasable catch or may be magnetic in nature. In alternative embodiments the securing mechanism may be omitted the removable haptic feedback module 160 may employ a friction or interference fit in the respective one first and second chambers C1, C2.

A finger recess 168 may be provided to facilitate removal of the haptic feedback modules 160 from the frame member 114C. In order to removal of the haptic feedback modules 160 the front case panel 114F may be detachably mounted to the frame member 114C.

In other embodiments it is envisaged the first and second chambers C1, C2 may be employed as storage compartments for example for holding interchangeable component parts of the controller 110 such as, but not limited to, a thumbstick stalk or actuator, a D-pad actuator, a paddle lever.

In still other embodiments the first and second chambers C1, C2 may be employed to provide one or more additional electronic devices for example, but not limited to an additional or supplementary battery, wireless communication device, sensors such as but not limited to accelerometers, gyroscopes, GPS sensor, audio speakers, microphones.

In alternative embodiments, it is envisaged that the back case panel 114B may be detachable and the first and second chambers C1, C2 may be accessed by removal of at least a part of the back case panel 114B.

In other embodiments the controller 110 may comprise access panels provided on at least one of the front, back or sides of the controller which are removable from the controller 110 so as to enable a user to access the first and second chambers C1, C2.

In other embodiments the housing of the removable module

Figure 12:
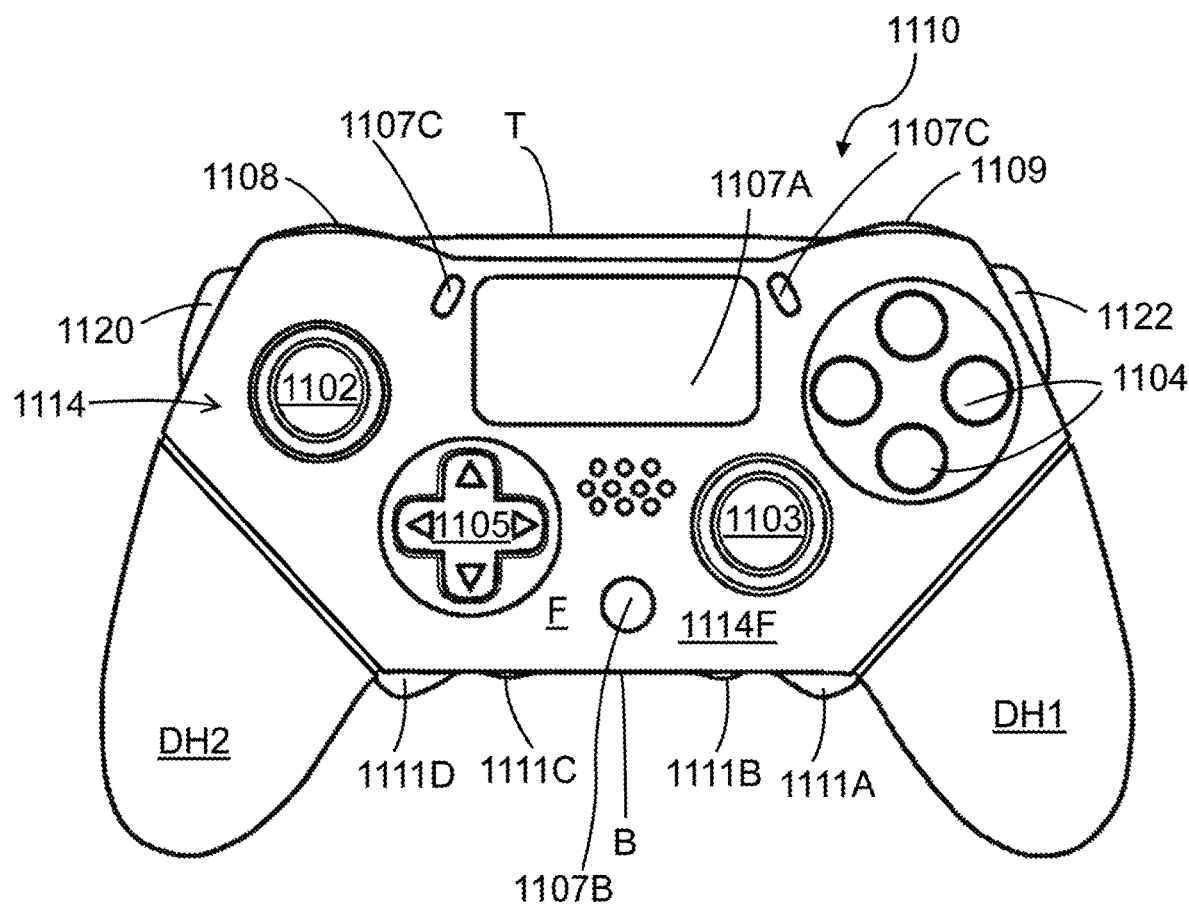
FIGS. 12 and 13 are plan views from above of an alternative input apparatus or controller for use with a computer.
Figure 13:
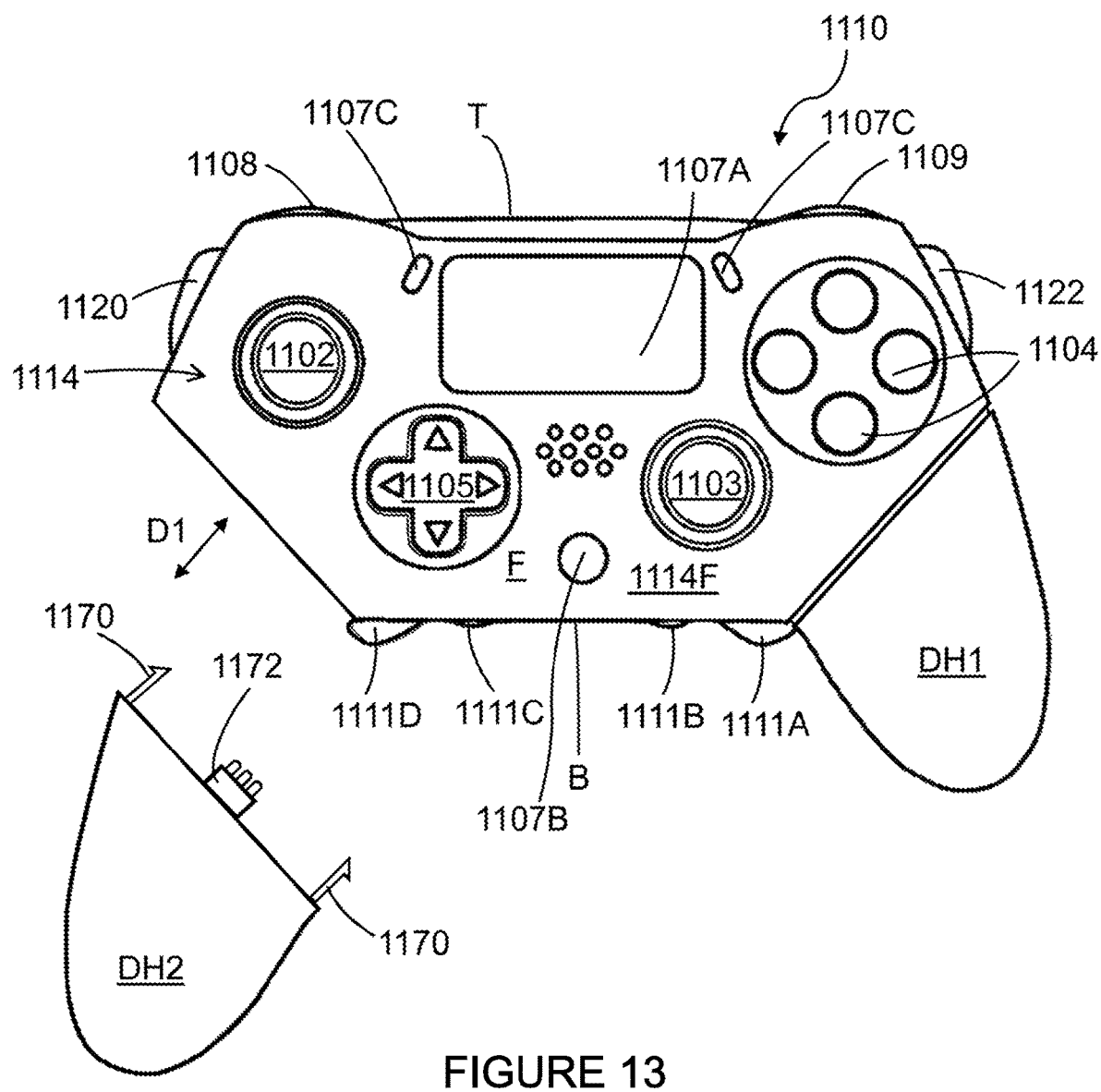

Referring now to FIGS. 12 and 13, there is shown an alternative embodiment of the present disclosure. In the further alternative illustrated embodiments like numerals have, where possible, been used to denote like parts, albeit with the addition of the prefix "1000" and so on to indicate that these features belong to the third embodiment. The alternative embodiment shares many common features with the first and second embodiments and therefore only the differences from the embodiment illustrated in FIGS. 1A to 11 will be described in any greater detail.

FIGS. 12 and 13 illustrate a plan views from above of an alternative input apparatus or controller 1110 for a use with a computer. The controller 1110 comprises a plurality of controls mounted thereto. The plurality of controls include a first, left, and a second, right, analogue control sticks, also known as thumb sticks 1102, 1103, which normally control movement and are intended to be operated by the user's left and right thumbs respectively, left and right thumb sticks are mounted to the front face of the controller 1110. There are four buttons 1104, located on the top face of the controller 1110, which normally control additional actions and are intended to be operated by the user's left thumb. There is a direction pad 1105 located on the front face of the controller 1110. The direction pad 1105 is intended to be operated by the user's right thumb, typically either as an alternative to the right thumb stick 1103 or to provide additional actions. A left shoulder button or bumper and a right shoulder button or bumper are located on the top face of the controller 1110. A left trigger and a right trigger are also located on the top face of the controller 1110. The left and right triggers are typically operated by a user's index fingers. The left and right bumpers may also be operated by a user's index fingers. The left and right triggers may analogue in nature, or may comprise a plurality of discrete digital states, that is to say the input control is dependent upon the degree of depression or displacement of the trigger body.

The controller comprises at least one paddle lever control 1111A, 1111B, 1111C, 1111D mounted to the back of the controller 1110.

The controller comprises at least one additional index finger control 1120, 1122 mounted to the side walls of the controller 1110 substantially as described with reference to the embodiment of FIGS. 1A to 10.

The controller 1110 comprises a chassis or frame member 1114M to which a first, right, handle module DH1 and a second left handle module DH2 are detachably mounted. The plurality of controls are mounted to chassis member 1114M.

The first handle module DH1 comprises a first chamber or interior. The second handle module DH2 comprises a second chamber or interior.

The first chamber C1 and second chamber C2 each define at least in part a void V for receiving an electronic device. The electronic device provides an additional or supplementary feature to the controller for example but not limited to a removable haptic feedback module. The haptic feedback module may take the form of a rumble or vibration module. In some embodiments the vibration module comprises an electric motor having an eccentric weight mounted to a drive shaft. Rotation of the motor causes the user to experience vibrations as the eccentric weight is moved.

The first and second handle modules DH1, DH2 each comprise a fastening mechanism 170, in the illustrated embodiment the fastening mechanism takes the form of a clip or latch mechanism, in other embodiments other mechanisms may be employed such as, but not limited to screw thread such as screws or bolts, bayonet fitting, magnets, The first and second handle modules DH1, DH2 each comprise an electrical connector 172 such that the electronic device disposed therein is in electrical communication with electrical component disposed in, or mounted to, the frame member 1114M. The electrical connector 172 mates or couples with a complementary connector (not shown) mounted to the frame member 1114M.

A release mechanism (not shown) may be provided to release the first and second handle modules DH1, DH2 from the frame member 1114M.

A finger recess may be provided to facilitate removal of first and second handle modules DH1, DH2 from the frame member 1114M.

In embodiments of the disclosure the first and second handle modules DH1, DH2 may be employed to provide one or more additional features for example, but not limited to an additional or supplementary battery, wireless communication device, sensors such as but not limited to accelerometers, gyroscopes, GPS sensor, audio speakers, microphones, wireless charging module.

It can be appreciated that various changes may be made within the scope of the present invention. For example, the size and shape of the paddles may be adjusted to accommodate controllers of differing size or shape.

In some embodiments the microswitches may be replaced with a magnetic switch or sensor, for example a reed switch or hall sensor; the paddles may comprise a magnet arranged so as to activate the magnetic switch or sensor when the paddle is depressed by a user. It is envisaged that in such embodiments the magnetic switch or sensor is mounted inside the controller behind the back panel and that there will be no requirement to provide apertures through the back panel in order that the paddles can physically contact the microswitches. Further it is envisaged that the user may be provided with feedback to indicate that the switch has been activated. The feedback may be aural or haptic, for example, such as an audible click.

It is envisaged that the controllers may be coupled to a games console or computer by a wired connection or by a wireless connection device.

It is also envisaged that the controller may be constructed as a shell or caddy into which a hand-held electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It will be recognised that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An input apparatus for a computing device, the input apparatus comprising:
   a case comprising a front face, a back face opposite the front, a top disposed between the front face and back face, and a pair of handles, the shaped to be held by the handles in both hands of a user during operation of the input apparatus without the need for additional support;
   at least one top control located on the top of the case, the at least one top control configured to be operated by an index finger of the user to provide an input a program executing on the computing device;
   a plurality of front controls removably coupled to the apparatus through the front face of the case to releasably connect with actuators disposed at least partially within the case, each of the plurality of front controls configured to be operated by a thumb of the user to provide additional inputs to the program executing on the computing device;
   a face plate with a plurality of apertures, the face plate configured to removably couple to the case so that the plurality of front controls extend through the plurality of apertures, wherein at least one of the plurality of openings in the face plate has a cross shape;
   wherein one or more of the plurality of front controls are removable by detaching the face plate from the front face and decoupling one or more of the plurality of front controls from the apparatus without disassembling the case.

2. The input apparatus of claim 1 wherein the faceplate is configured to magnetically couple to the case.

3. The input apparatus of claim 1, further comprising at least one side control located at an outer surface of at least one of the handles in a position to be operated by an intermediate portion of the index finger of the user.

4. The input apparatus of claim 3, further comprising a switch in communication with the side control, the switch configured to provide a third input to the program executing on the computing device when the switch is activated by the side control.

5. The input apparatus of claim 1, wherein a first of the plurality of front controls comprises a thumbstick.

6. The input apparatus of claim 1 further comprising a plurality of back controls at the back face of the apparatus in a position to be activated by a middle, ring, or little finger of the user.

7. The input apparatus of claim 6, wherein each of the plurality of back controls are removably affixed to an outer surface of the back face.

8. The input apparatus of claim 6 wherein the plurality of back controls comprise elongate members.

9. The input apparatus of claim 6, further comprising a plurality of back switches, each back switches in communication with one of the plurality of back controls, the plurality of back switches each configured to provide control inputs to the program executing on the computing device when each switch is activated by its respective back control.

10. The input apparatus of claim 1, wherein each of the pair of handles has an opening forming a compartment configured to removably receive an electronic component, wherein the electronic components are removable by detaching the face plate from the front face of the apparatus and decoupling the electronic component from its respective compartment without disassembling the case.

11. The input apparatus of claim 10 wherein at least one of the electronic components comprises a vibration motor.

12. A hand held controller for controlling a program executing on a computing device, the hand held controller comprising:
   a case having a front face, a back face opposite the front face, a top face and a pair of opposing side walls, the outer case being shaped to be held in both hands of a user during operation without the need for additional support, wherein each opposing side wall is adjacent a handle of the controller;
   at least one top control located on the top face of the apparatus, the at least one top control configured to be operated by an index finger of the user;
   at least one front control removably coupled to the controller through the front face of the case to releasably connect with at least one actuator disposed at least partially within in the case, the at least one front control configured to be operated by a thumb of the user to provide an additional input to the program executing on the computing device;
   a face plate with a plurality of apertures, the face plate configured to removably couple to the case so that the at least one front control extends through one of the plurality of apertures; and
   at least one back control located at the back face of the case in a position to be operated by a middle, ring, or little finger of the user to provide a third input to the program executing on the computing device,
   wherein the at least one front control is removable by detaching the face plate from the front face and decoupling the at least one front control from the apparatus without disassembling the case.

13. The hand held controller of claim 12 wherein the faceplate is configured to magnetically couple to the case.

14. The hand held controller of claim 12, further comprising at least one side control located at a first of the pair of opposing side walls in a position to be operated by an intermediate portion of the index finger of the user to provide a fourth input to the program executing on the computing device.

15. The hand held controller of claim 12, wherein the at least one front control comprises a thumbstick.

16. The hand held controller of claim 12 wherein the at least one front control comprises a directional pad.

17. The hand held controller of claim 16, wherein the at least one back control is removably affixed to an outer surface of the back face.

18. The hand held controller of claim 12, wherein each handle has an opening forming a compartment configured to removably receive an electronic component, wherein the electronic components are removable by detaching the face plate from the front face of the apparatus and decoupling the electronic component from its respective compartment without disassembling the case.

19. The hand held controller of claim 18 wherein at least one of the electronic components comprises a vibration motor.

20. A hand held controller for controlling a program executing on a computing device, the hand held controller comprising:
   a case having a front face, a back face opposite the front face, a top face and a pair of opposing side walls, the outer case being shaped to be held in both hands of a user during operation without the need for additional support, wherein each opposing side wall is adjacent a handle of the controller and wherein each handle of the controller has an opening forming a compartment configured to removably receive a vibration motor;

at least one top control located on the top face of the apparatus, the at least one top control configured to be operated by an index finger of the user;

at least one front control removably coupled to the controller through the front face of the case to releasably connect with at least one actuator disposed at least partially within in the case, the at least one front control configured to be operated by a thumb of the user to provide an additional input to the program executing on the computing device;

a face plate with a plurality of apertures, the face plate configured to removably couple to the case so that the at least one front control extends through one of the plurality of apertures; and at least one back control located at the back face of the case in a position to be operated by a middle, ring, or little finger of the user to provide a third input to the program executing on the computing device, wherein the at least one front control and the vibration motors are removable by detaching the face plate from the front face, decoupling the at least one front control and vibration motor from the apparatus without disassembling the case.

* * * * *